T. J. ELLISON.
ANIMAL TRAP.
APPLICATION FILED FEB. 17, 1919.
1,303,547.
Patented May 13, 1919.
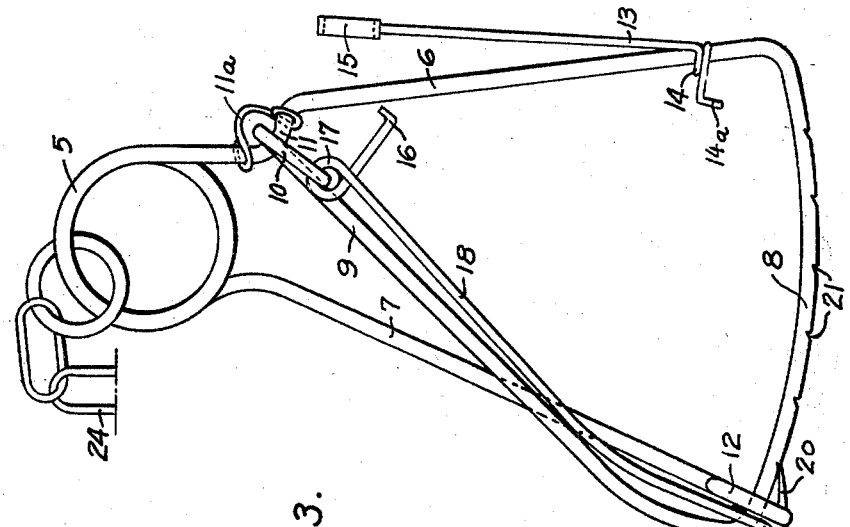
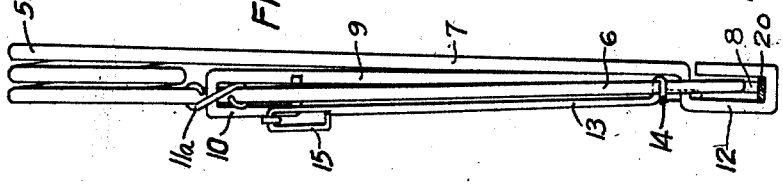
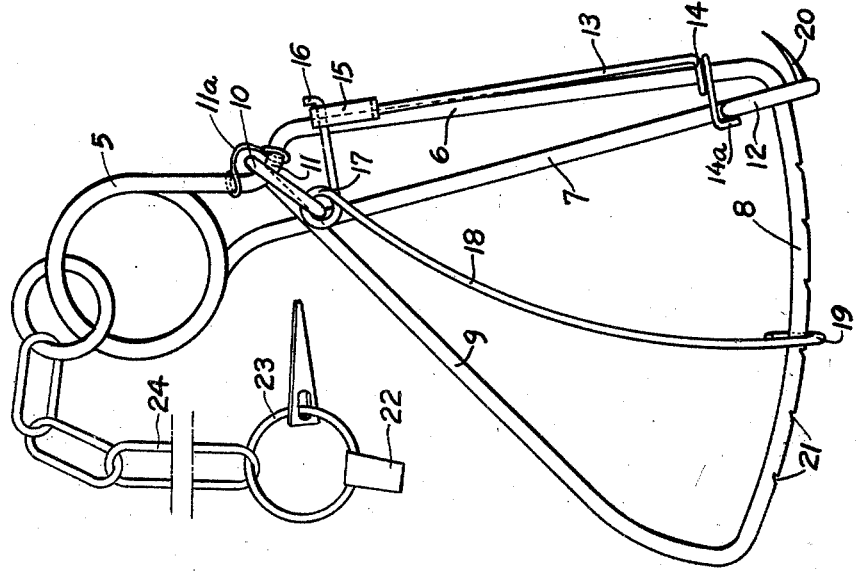
Inventor
Thomas J. Ellison
By
Attorneys

UNITED STATES PATENT OFFICE.

THOMAS J. ELLISON, OF TERRILL, KENTUCKY.

ANIMAL-TRAP.

1,303,547. Specification of Letters Patent. Patented May 13, 1919.

Application filed February 17, 1919. Serial No. 277,456.

*To all whom it may concern:*

Be it known that I, THOMAS J. ELLISON, a citizen of the United States, residing at Terrill, in the county of Madison and State of Kentucky, have invented new and useful Improvements in Animal-Traps, of which the following is a specification.

This invention relates to animal traps of that class consisting of a looped member in which the victim is gripped by a spring-tensioned member upon attempting to pass through the loop.

The invention has for its object to provide a simple and highly efficient trap of the kind stated, and to this end it consists in a novel combination and arrangement of parts to be hereinafter described and claimed.

In order that the invention may be better understood, reference is had to the accompanying drawing forming a part of this specification, and in said drawing, Figure 1 is a plan view of the trap showing the same set;

Fig. 2 is a similar view showing the trap sprung, and

Fig. 3 is an edge view of the trap.

Referring specifically to the drawing the main portion of the trap consists of two spring-tensioned members composed of a single piece of wire which is bent intermediate its end into a spring coil 5 having two arms 6 and 7, respectively, extending from its outer convolutions. At the outer end of the arm 6 is a lateral, curved bend 8 terminating in a return bend 9 toward the inner end of the arm 6 adjacent to the coil 5, the end of the wire being formed into a loop 10 which passes around the arm 6 and engages a shoulder 11 on the latter produced by a lateral bend, and is tied thereto by a wire 11ª. The parts 6, 8 and 9 form an open loop. The arm 7 extends from the coil 5 in the same direction as the arm 6 and is spaced laterally therefrom. The outer end of the arm 7 is provided with a loop or eye 12 extending around the cross bar or bend 8, the latter being loose in the loop. The spring arm 7 is adapted to be swung across the loop formed by the parts 6, 8 and 9 to come alongside the arm 6 and it is in this position when the trap is set. When the trap is sprung the arm 7, being spring-tensioned, sweeps across the loop in the direction of the side member 9 thereof and hence the animal which may have entered the loop or the space between the arm 7 and the side member 9 is caught and firmly held.

The arm 6 carries a detent for holding the spring arm 7 in set position. This detent is a piece of wire 13 which is looped loosely around the arm 6, as shown at 14, to slide thereon, and has one end offset as shown at 14ª to engage the looped extremity 12 of the arm 7. The other end of the detent wire has a loop 15 which is engageable by a trigger 16 composed of a piece of wire which is pivoted to the looped end 10 of the part 9 by being bent loosely around the same as shown at 17. The trigger has an arm 18 having at its outer end a guide eye 19 through which the cross bar 8 loosely passes. When the trap is set, the detent 14ª engages the part 12 of the arm 7, and the detent is held by the trigger end 16 seating in the loop 15. The arm 7 is now held adjacent to the arm 6, with the trigger arm 18 extending across the loop formed by the arm 6, the cross bar 8 and the arm 9. It will therefore be seen that the animal cannot pass through the loop without disturbing the trigger arm, and in attempting to force a passage through the loop, the trigger arm 18 is swung, whereupon the part 16 thereof slips out of the loop 15 of the detent, and as the latter is now left free, the spring arm 7 is released, and said arm sweeps across the loop formed by the parts 6, 8 and 9 as hereinbefore described. In order to prevent the trapped animal from forcing the spring arm 7 back, the outer looped end 12 thereof carries a spring tongue 20, and on the cross member 8 are notches 21 engageable by said tongue. These parts are so arranged that the tongue slips freely along the part 8 when the spring arm 7 is sprung, but they prevent a return movement of the latter. However, the spring arm can be readily set upon holding the spring tongue 20 away from the notched portion of the part 8, and in order to facilitate the latter operation, the device shown at 22 is provided, the same being slipped under the tongue so that it may slide over the notches 21. The device 22 is shown carried by a ring 23 on the outer end of a chain 24 attached to the coil 5, this chain also serving as a means for anchoring the trap in place.

The trap may be set across the den of the animal to be caught so that the animal must pass through the loop in entering or leaving the den, and it can also be set across muskrat dens beneath the water. The trap can also be used in various other ways and it is highly efficient in operation. The trap can be set light or heavy by sliding the detent 13 up or down, this being permitted by the loop 15.

I claim:

1. An animal trap comprising a pair of spring-tensioned arms one of which is looped, the connecting outer portion of the loop having notches, and the other arm being positioned to swing across the loop from one side to the opposite side and having at its outer end a guide eye through which the aforesaid connecting outer portion of the loop passes, and said outer end of the arm having a spring tongue engageable with the notches for locking the arm against a return movement after it is sprung, a detent for holding the last mentioned arm adjacent to one side of the loop, and a trigger engageable with the detent and having an actuating arm extending into the loop.

2. An animal trap comprising a pair of spring-tensioned arms one of which is looped and the other arm being positioned to swing across the loop from one side to the opposite side, a detent for holding the last mentioned arm adjacent to one side of the loop, the detent being slidably mounted on said side of the loop, and a trigger engageable with the detent and having an actuating arm extending into the loop, that portion of the detent which is engaged by the trigger being looped.

In testimony whereof I affix my signature.

THOMAS J. ELLISON.

Copies of this patent may be obtained for five cents each, by addressing the "Commissioner of Patents, Washington, D. C."